United States Patent
Xu et al.

(10) Patent No.: US 12,099,506 B2
(45) Date of Patent: *Sep. 24, 2024

(54) FEDERATED QUERY OPTIMIZATION

(71) Applicant: Tableau Software, LLC, Seattle, WA (US)

(72) Inventors: Liqi Xu, Urbana, IL (US); Richard L. Cole, Los Gatos, CA (US); Daniel Ting, Edmonds, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,300

(22) Filed: Apr. 25, 2023

(65) Prior Publication Data
US 2023/0315731 A1 Oct. 5, 2023

Related U.S. Application Data

(63) Continuation of application No. 16/573,988, filed on Sep. 17, 2019, now Pat. No. 11,636,108.
(Continued)

(51) Int. Cl.
*G06F 16/24* (2019.01)
*G06F 16/2453* (2019.01)
(Continued)

(52) U.S. Cl.
CPC .. *G06F 16/24545* (2019.01); *G06F 16/24537* (2019.01); *G06F 16/256* (2019.01); *G06N 5/04* (2013.01); *G06N 20/00* (2019.01)

(58) Field of Classification Search
CPC .................................................. G06F 16/24545
(Continued)

(56) References Cited

U.S. PATENT DOCUMENTS 10,853,741 B2 * 12/2020 Zagoudis ............... G06Q 10/00
11,093,496 B1 * 8/2021 Bhatia ............... G06F 16/24552
(Continued)

OTHER PUBLICATIONS

Xu, Office Action, Dec. 17, 2021, 23 pgs.
Xu, Final Office Action, Apr. 4, 2022, 31 pgs.
Xu, Notice of Allowance, Dec. 1, 2022, 7 pgs.

*Primary Examiner* — Syling Yen
(74) *Attorney, Agent, or Firm* — Morgan, Lewis & Bockius LLP

(57) ABSTRACT

A method selects a federation engine to process a query. The system receives a query that specifies retrieval of data from multiple data sources at distinct physical locations. The system generates multiple federated query plans. Each federated query plan specifies execution of the query using a respective data source as the federation engine. For each federated query plan, the system forms a feature vector including two or more of: (1) a remote cost estimate for executing query operators on data sources distinct from the respective data source; (2) a local cost estimate for executing query operators on the respective data source; and (3) a data transfer cost estimate for transferring partial results from external data sources to the respective data source. The system predicts runtime for each federated query plan, selects a preferred federated query plan using the predicted runtimes, and the preferred federated query plan specifies the federation engine.

20 Claims, 6 Drawing Sheets

Related U.S. Application Data

(60) Provisional application No. 62/820,212, filed on Mar. 18, 2019.

(51) Int. Cl.
    *G06F 16/25*     (2019.01)
    *G06N 5/04*     (2023.01)
    *G06N 20/00*     (2019.01)

(58) Field of Classification Search
    USPC ........................................................ 707/718
    See application file for complete search history.

(56) References Cited

U.S. PATENT DOCUMENTS

| | | | |
|---|---|---|---|
| 2007/0226178 A1* | 9/2007 | Ewen | G06F 16/2453 |
| 2013/0151504 A1* | 6/2013 | Konig | G06F 16/245 |
| | | | 707/718 |
| 2016/0283551 A1* | 9/2016 | Fokoue-Nkoutche | ........................ |
| | | | G06F 16/182 |
| 2017/0031986 A1* | 2/2017 | Li | G06F 16/24542 |
| 2019/0065775 A1* | 2/2019 | Klucar, Jr. | G06F 16/24552 |
| 2019/0370257 A1* | 12/2019 | Wolf | G06F 16/24545 |
| 2020/0142894 A1* | 5/2020 | Papaemmanouil | ........................ |
| | | | G06F 16/2453 |
| 2020/0272667 A1* | 8/2020 | Ding | G06F 16/901 |
| 2021/0150056 A1* | 5/2021 | Vax | G06F 16/285 |

\* cited by examiner

FEDERATED QUERY OPTIMIZATION

RELATED APPLICATIONS

This application is a continuation of U.S. application Ser. No. 16/573,988, filed Sep. 17, 2019, entitled "Federated Query Optimization," which claims priority to U.S. Provisional Patent Application No. 62/820,212, filed Mar. 18, 2019, entitled "Federated Query Optimization," each of which is incorporated by reference herein in its entirety.

TECHNICAL FIELD

The disclosed implementations relate generally to database query optimization and more specifically to systems and methods that enable optimization of federated queries.

BACKGROUND

A proliferation of datasets generated and residing on multiple sources has led to increasing demand for querying data managed by more than one database. To support this growing demand, for instance, Tableau supports queries that access more than 60 relational data sources. Tableau allows users to create connections to a large number of data sources, such as Microsoft SQL, Oracle, and PostgreSQL, and to join datasets from those data sources via cross-databases join features. A federated query is a query that retrieves information from datasets stored in a plurality of data sources. Typical data sources are heterogeneous systems (e.g., relational databases or Excel) on either local or remote servers. To execute a federated query, a database system designates one data source as the federation engine that controls and coordinates a federation of data sources. A federation engine is thus in charge of generating a federated query plan, receiving and processing data transferred from other data sources, and returning final results.

Selecting a federation engine to process a federated query has a significant impact on the overall runtime of the query. Some systems use a static assignment and designate a server to be a federation engine regardless of data distribution or other factors (e.g., network topology). This approach is not optimal in many scenarios. Suppose there is a small dataset and a large dataset stored on two distinct remote data sources. The static assignment approach requires moving the large dataset to the federation engine, and thus increases the overall query latency for the federated query. Some systems use query optimizers that utilize knowledge about the data, queries, and a variety of query evaluation algorithms to optimize queries. However, when the data source is owned by another database management system, a query optimizer lacks the knowledge to make optimization decisions. Moreover, since data sources are developed by third-parties or operate within firewalls, a system that processes federated queries is prevented from modifying query execution plans generated by those third-party data sources. Such systems also lack statistics (e.g., histograms of runtime) managed by third-party data sources for optimizing a federated query.

SUMMARY

Accordingly, there is a need for methods and systems that improve query runtimes in federated query processing systems. The disclosed systems and methods generate sample federated query plans, extract a plurality of features based on those plans, and train regressions models based on those features. Based on these models, the systems and methods improve federated query processing time.

In accordance with some implementations, a method executes at a computer system having one or more processors and memory storing one or more programs configured for execution by the one or more processors. The method builds a model for predicting runtimes of federated queries, according to some implementations. The method includes obtaining a plurality of queries (sometimes called federated queries). Each query specifies retrieval of data from datasets stored in a plurality of data sources (e.g., in different physical locations). Each data source is coupled to the other data sources via a communication network. The method further includes generating a plurality of federated query plans for each federated query. Each federated query plan corresponds to executing a respective federated query using a respective data source as the federation engine. Each federated query plan includes a plurality of query operators. Each query operator specifies retrieval of data from datasets stored in a corresponding data source.

The method includes, for each federated query plan, forming a feature vector whose components include a plurality of features. The features include a plurality of: a remote cost estimate for executing query operators of the respective federated query plan on data sources distinct from the respective data source, a local cost estimate for executing query operators of the respective federated query plan on the respective data source, and a data transfer cost estimate for transferring partial results of the respective federated query plan, via the communication network, from data sources distinct from the respective data source to the respective data source.

The method further includes training a regression model, using the feature vectors for the plurality of federated query plans, to predict runtimes for executing federated queries using each of the plurality of data sources as the federation engine.

In some implementations, the method obtains the remote cost estimate, the local cost estimate, and the transfer cost estimate by measuring computation and communication times by executing the respective federated query plan on its corresponding data source.

In some implementations, the regression model comprises a plurality of classifiers. Each classifier is a respective decision tree constructed according to a respective distinct subset of the plurality of features and according to a respective distinct subset of predetermined sample feature vectors corresponding to queries with predetermined runtimes. Each classifier predicts a respective predicted runtime for executing queries. The regression model predicts the runtimes for executing queries using a weighted sum of the plurality of predicted runtimes.

In some implementations, the feature vector includes extracted features including one or more of: query operator identifiers corresponding to query operators in the respective federated query plan; table identifiers corresponding to tables accessed by the respective federated query plan; data field identifiers corresponding to data fields accessed by the respective federated query plan; and a network topology identifier corresponding to network topology of the communication network.

In some implementations, prior to generating the plurality of federated query plans, the method includes assigning each dataset of one or more datasets to a first data source of the plurality of data sources. The one or more datasets correspond to datasets required for processing the plurality of queries. The feature vector further includes one or more features extracted from an assignment identifier corresponding to the assignment of the one or more datasets. In some implementations, the method further includes classifying each dataset based on subject areas, and assigning each dataset to a respective data source based on its subject area.

In some implementations, the remote cost estimate includes cost estimates for joining one or more tables on data sources distinct from the respective data source.

In some implementations, the plurality of data sources includes one or more PostgreSQL servers that support access to data stored in other data sources using a Foreign Data Wrapper (FDW). The data transfer cost estimate includes estimation of the cost of data transfers between data sources using FDW.

In some implementations, the plurality of queries includes one or more of: Join Order Benchmark (JOB) and TPC-H benchmark.

In some implementations, the feature vector includes one or more features that identify table sizes corresponding to tables accessed by the respective federated query plan.

In some implementations, the plurality of federated query plans includes a first federated query plan and a second federated query plan, the first and the second federated query plans each corresponding to executing a first federated query using a first data source as a federation engine.

In some implementations, the plurality of federated query plans is generated using a query optimizer.

In some implementations, the plurality of federated query plans includes at least one query plan that uses a Nested Loop join.

In some implementations, the feature vector includes one or more features that measure robustness of the respective federated query plan.

In some implementations, the plurality of data sources includes at least one third-party data source.

In another aspect, a method is provided for selecting a federation engine to process a federated query. The method is performed at a computer system having one or more processors and memory storing one or more programs configured for execution by the one or more processors. The method includes receiving, from a client, a query that specifies retrieval of data from datasets stored in a plurality of data sources (e.g., at distinct physical locations), each data source coupled to the other data sources via a communication network. The method also includes generating a plurality of federated query plans based on the query. Each federated query plan corresponds to executing the query using a respective data source as the federation engine. Each federated query plan includes a plurality of query operators. Each query operator specifies retrieval of data from datasets stored in a corresponding data source. For each federated query plan, the method includes forming a feature vector $v=[v_1, V_2, \ldots, V_n]$ whose components include a plurality of features. The plurality of features includes one or more of: a remote cost estimate for executing query operators of the respective federated query plan on data sources distinct from the respective data source; a local cost estimate for executing query operators of the respective federated query plan on the respective data source; and a data transfer cost estimate for transferring partial results, via the communication network, from data sources distinct from the respective data source to the respective data source.

The method further includes performing a sequence of steps for each of the federated query plans. The sequence of steps includes, for each classifier of a plurality of trained classifiers, computing a respective predicted runtime for executing the respective federated query plan. Each classifier is a respective decision tree constructed according to a respective distinct subset of the plurality of features and according to a respective distinct subset of predetermined sample feature vectors corresponding to queries with predetermined runtime. The sequence of steps also includes computing an overall predicted runtime for executing the respective federated query plan using a weighted sum of the plurality of predicted runtimes, and ranking the plurality of federated query plans based on the overall predicted runtimes for each of the federated query plans to obtain a preferred federated query plan. The sequence of steps further includes selecting, from the plurality of data sources, a federation engine based on the preferred federated query plan.

In some implementations, the method further includes coordinating executions and data movements among the plurality of data sources for executing the query using the federation engine.

In some implementations, the method further includes selecting, from the plurality of data sources, a plurality of federation engines based on ranking the plurality of federated query plans.

In another aspect, an electronic device includes one or more processors, memory, a display, and one or more programs stored in the memory. The programs are configured for execution by the one or more processors and are configured to perform any of the methods described herein, according to some implementations.

In another aspect, a non-transitory computer-readable storage medium stores one or more programs configured for execution by a computing device having one or more processors, memory, and a display. The one or more programs are configured to perform any of the methods described herein, according to some implementations.

Thus methods and systems are disclosed that allow optimization of federated queries by training regression models using federated query plans, and selecting federation engines to execute the federated queries using the trained regression models.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
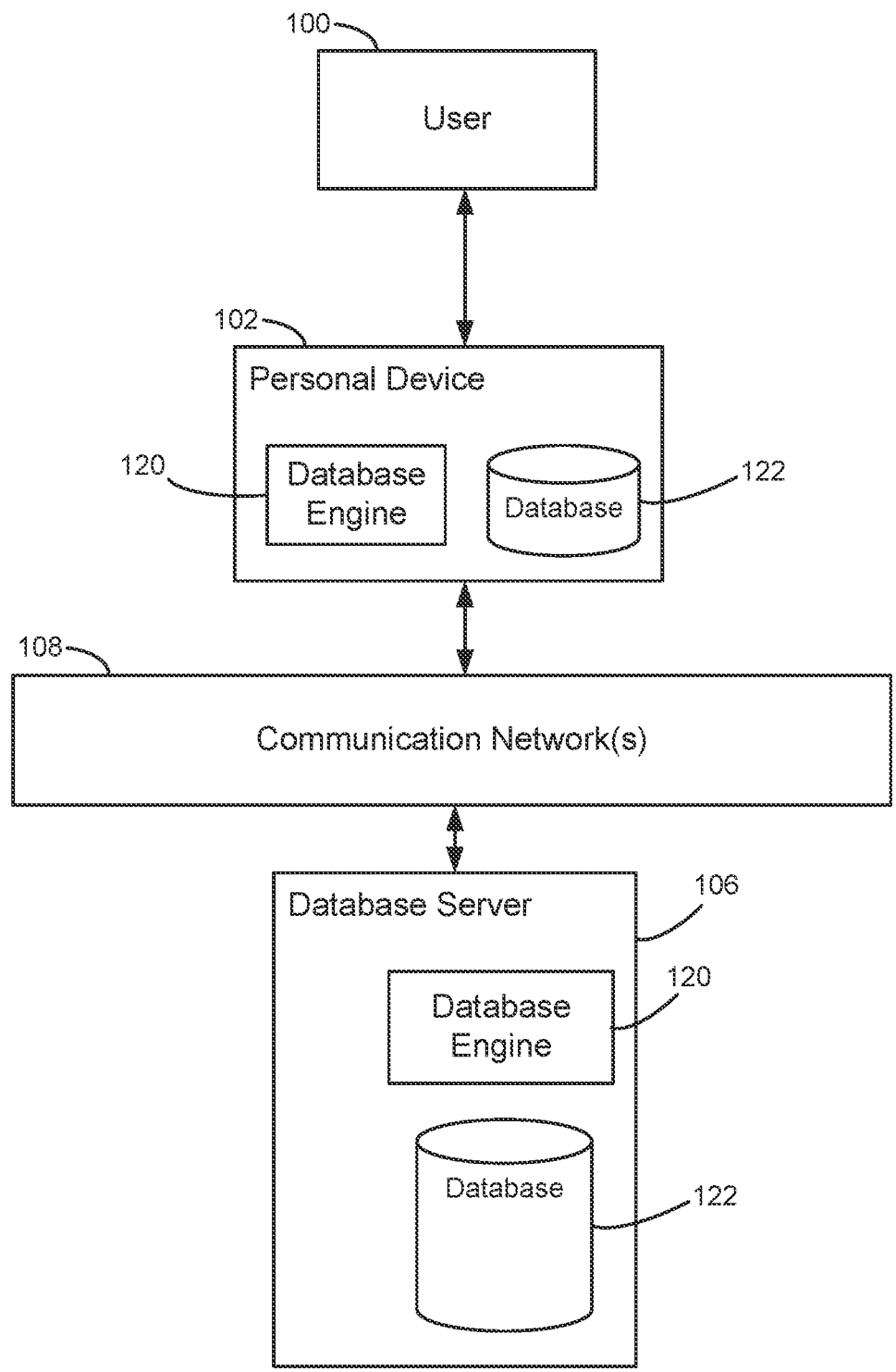
FIG. 1 illustrates a database system that retrieves data from a database in response to a database query in accordance with some implementations.

FIG. 1 illustrates a database system that retrieves data from a database in response to a database query in accordance with some implementations. A user 100 interacts with a personal device 102, such as a desktop computer, a laptop computer, a tablet computer, a mobile smartphone, or a mobile computer system. A personal device 102 is an example of a computer system 200. The term "computer system" also includes server computers, which may be significantly more powerful than a personal device used by a single user, and are generally accessed by a user indirectly via a personal device. An example computer system 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). Data stored in the relational databases 122 of the personal device 102 is retrieved in accordance with database queries received by the database engine 120. In some implementations, the personal device 102 includes a data visualization application 222, which the user 100 uses to create data visualizations from the desktop data sources 224 and/or the relational databases 122. For example, the data visualization application 222 of the personal device 102 generates a database query for a data visualization, and sends the database query to the database engine 120. The database engine 120 then retrieves data stored in the database 122 of the personal device 102 in response to the database query. Upon receiving the retrieved data from the database engine 120, the data visualization application 222 visualizes the retrieved data locally, thereby enabling the user 100 to visualize the data that is stored locally on the personal device 102.

In some implementations, the personal device 102 connects to one or more external database servers 106. Each of the one or more database servers 106 includes a database engine 120 configured to access one or more databases 122 that are stored at the respective database server 106.

In some implementations, the personal device 102 connects to the external database servers 106 over one or more communications networks 108. The communication networks 108 can include one or more network topologies, including the Internet, intranets, local area networks (LANs), cellular networks, Ethernet, Storage Area Networks (SANs), telephone networks, Bluetooth personal area networks (PAN), and the like.

In accordance with some implementations, upon receiving a database query that includes a plurality of clauses, the database engine 120 parses the database query to form an operator tree including a plurality of join operators, performs one or more optimization passes on the operator tree to form an optimized execution plan, and executes the optimized execution plan to retrieve a result set from the database. In some implementations, the plurality of join operators includes one or more of: inner joins, outer joins, mark joins, and single joins. In some implementations, the plurality of join operators also includes one or more of: semi joins, anti-semi joins, and dependent join variants of inner joins, semi joins, anti-semi joins, left outer joins, and full outer joins.

During the course of parsing the database query to form the operator tree, the database engine 120 determines, for each of the plurality of clauses, whether the respective clause includes a scalar subquery and/or whether the respective clause includes any of a predetermined set of predicate subqueries, including EXISTS subqueries, NOT EXISTS subqueries, UNIQUE subqueries, and quantified comparison predicates. When the respective clause includes one of the predetermined set of predicate subqueries, the operator tree incorporates a respective node that specifies a mark join operator between a respective left data set and a respective right data set. In some implementations, the database engine 120 determines, for each of the plurality of clauses, whether the respective clause includes a scalar subquery. When the respective clause includes a scalar subquery, the operator tree incorporates a respective node that specifies a single join operator between a respective left data set and a respective right data set. When the respective clause does not include a scalar subquery and does not include any of the predetermined set of predicate subqueries, the operator tree incorporates a standard join operator (e.g., an inner join or an outer join) to the operator tree for each join condition in the respective clause.

An inner join is a cross product of a left data set $T_1$ and a right data set $T_2$ followed by a selection:

$$T_1 \bowtie T_2 := \sigma(T_1 \times T_2) \tag{1}$$

The selection $\sigma$ identifies the tuples in the cross product that satisfy the predicate p. The inner join computes a combination of matching entries from the left data set $T_1$ and the right data set $T_2$ according to the predicate p (e.g., comparing equality of a field in $T_1$ with a field in $T_2$).

In some instances, a database query includes a correlated subquery, and the subquery (as written) is evaluated for every tuple of a corresponding outer query. Some implementations translate a correlated subquery into a dependent join, which is characterized as:

$$T_1 \bowtie_p T_2 := [t_1°t_2 | t_1 \in T_1 \wedge t_2 \varepsilon T_2(t_1) \wedge p(t_1°t_2)]. \tag{2}$$

Where $p(t_1°t_2)$ determines whether the combination satisfies the predicate. The right-hand side is evaluated for every tuple of the left-hand side. In some instances, the attributes produced by an expression T are denoted by A(T), and free variables occurring in an expression T are denoted by F(T). In some implementations, to evaluate a dependent join, $F(T_2 \subseteq A(T_1)$ must hold (i.e., the attributes required by $T_2$ must be produced by $T_1$). In some implementations, a dependent join is associated with one or more transformation rules. In some implementations, a dependent join and the corresponding transformation rules are applied while unnesting, thereby optimizing the database query.

Semi joins, anti-semi joins, left outer joins, and full outer joins are represented by the following formulas:

| Join Type | Formula | Eq. |
|---|---|---|
| semi | $T_1 \ltimes_p T_2 := \{t_1 | t_1 \in T_1 \wedge \exists\, t_2 \in T_2 : p(t_1 \circ t_2)\}$ | (3) |
| anti-semi | $T_1 \triangleright_p T_2 := \{t_1 | t_1 \in T_1 \wedge \nexists\, t_2 \in T_2 : p(t_1 \circ t_2)\}$ | (4) |
| left outer | $T_1 \mathbin{⟕}_p T_2 := (T_1 \bowtie_p T_2) \cup \{t_1 \circ_{a \in A(T_2)}\, (a : \text{null}) | t_1 \in (T_1 \triangleright_p T_2)\}$ | (5) |
| full outer | $T_1 \mathbin{⟗}_p T_2 := (T_1 \bowtie_p T_2) \cup \{t_2 \circ_{a \in A(T_1)}\, (a : \text{null}) | t_2 \in (T_2 \triangleright_p T_1)\}$ | (6) |

Each of the above join types has a corresponding dependent join variant that is analogous to the dependent join illustrated above in equations (1) and (2) for an inner join.

In addition to the join operators, the group by operator is represented as follows:

$$\Gamma_{A;\alpha:f}(e) := \{x^\circ(\alpha:f(y)) | x \in \Pi_A(e) \wedge y = \{z | z \in e \wedge \forall_{\alpha \in A}: x.\alpha = z.\alpha\}\} \quad (7)$$

which groups an input e (e.g., a base relation or a relation computed from another algebra expression) by A, and evaluates one (or more comma separated) aggregation function(s) to compute aggregated attributes. In some situations, A is empty, so a single aggregation tuple is produced as a result of the group by operator.

A single join operator behaves essentially like an outer join operator, except that a single join operator will raise an error when there is a row in the left data set with two or more join partners in the right data set. A single join operator is particularly useful for translating a subquery that is intended to compute a scalar value (i.e., the subquery is expected to produce exactly one column and at most one row.) Specifically, when a subquery produces a single result, the single result is used as a scalar value, and when the subquery produces no result, the scalar value is set as NULL. However, when the subquery produces more than one result, the database engine 120 reports a runtime error. A single join operator is used to express this in the extended relational algebra. The formula for a single join operator can be expressed as:

$$T_1 \bowtie^1_p T_2 := \begin{cases} \text{runtime error,} & \text{if } \exists\, t_1 \in T_1 : (|\{t_1\} \bowtie_p T_2| > 1) \\ T_1 \mathbin{⟕}_p T_2, & \text{otherwise} \end{cases} \quad (8)$$

Using single join operators improves both performance of the database engine 120 and accuracy of the result set returned in response to a database query. On the performance side, a hash-based process for implementing the single join has a runtime of O(n), which is much better than the $O(n^2)$ runtime associated with a conventional mutual recursion approach. More importantly, unlike other join implementations, the single join operator reports an error if more than one join partner is found.

A mark join operator creates a mark column in the intermediate result set created for the join. The mark column specifies, for each tuple of the respective intermediate result set, whether or not the respective left data set has a join partner from the right data set. The mark join creates a new attribute column (e.g., a Boolean data field) to specify whether or not each tuple has at least one join partner:

$$T_1 \bowtie^{M:m}_p T_2 := \{t_1 \circ (m : \exists\, t_2 \in T_2 : p(t_1 \circ t_2)) | t_1 \in T_1\} \quad (9)$$

In some implementations, a mark join is evaluated in O(n) time when using hashing. Importantly, the query optimizer can optimize expressions in the relational algebra that include mark joins. In some implementations, the mark join operator is used to translate predicate subqueries that arise from exists, not exists, unique, and quantified comparisons, and may be further optimized to offer an efficient evaluation strategy.

Figure 2:
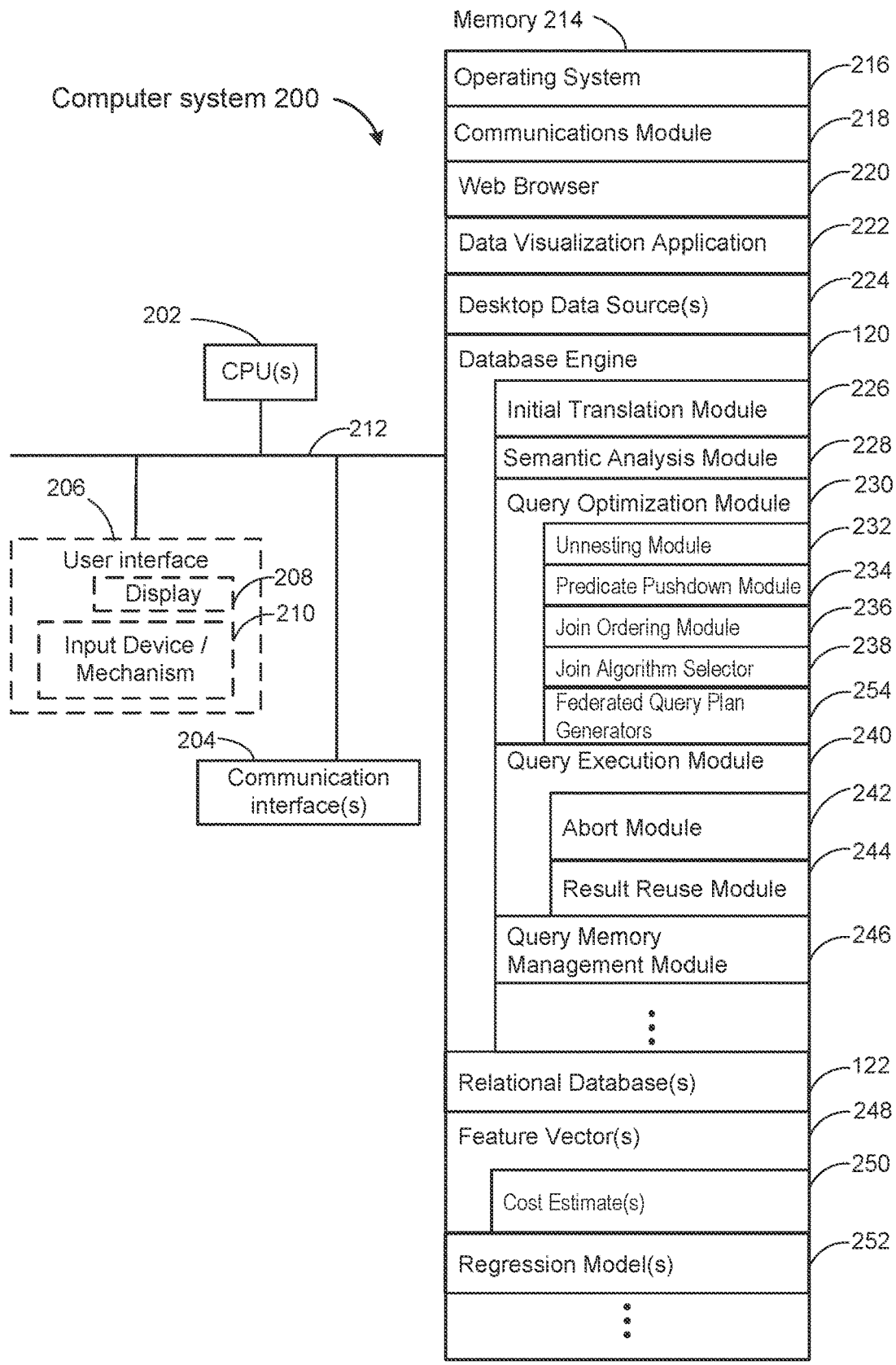
FIG. 2 is a block diagram of a computer system in accordance with some implementations.

FIG. 2 is a block diagram illustrating a computer system 200 in accordance with some implementations. As used herein, the term "computer system" includes personal devices 102, servers (such as a database server 106) or both. A computer system 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computer system 200 may include a user interface 206 including a display device 208 and one or more input devices/mechanisms 210. In some implementations, the input device/mechanism 210 includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 include a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a computer readable storage medium.

In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computer system 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server (not shown). In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a personal device 102, a data visualization server, or a database server 106). The data visualization application then generates and displays the retrieved information in one or more data visualizations;

zero or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);

a database engine 120, which receives database queries (e.g., from a data visualization application) and retrieves corresponding data from the relational database 122 in response to the database queries; and one or more relational databases 122, which store collections of related data organized according to a predetermined data structure and can be accessed by the database engine 120 using database queries. In some implementations, the relational databases 122 include collections of tables, views, stored procedures, and other database objects.

The database engine 120 further includes a plurality of executable modules. In some implementations, the memory 214, or the computer readable storage medium of the memory 214, stores the following executable modules of the database engine 120, or a subset thereof:

an initial translation module 226, which parses database queries (e.g., SQL database queries) to create operator trees (also referred to as abstract syntax trees or ASTs). This includes determining whether each clause of a database query includes a scalar subquery or any of the predetermined set of predicate subqueries, and adding to a corresponding operator tree a node that specifies a single join operator, a mark join operator, an inner join operator, an outer join operator, a semi join operator, or an anti-semi join operator;

a semantic analysis module 228, which parses the ASTs created from the database queries to create execution plans;

a query optimization module 230, which performs one or more optimization passes on each execution plan to form an optimized execution plan, and includes one or more of:

an unnesting module 232, configured to unnest the operators (e.g., using one or more mark joins or single joins);

a predicate pushdown module 234, configured to push down a subset of predicate subqueries of a database query to where data is stored, and filter out a subset of the data accessed for implementing the corresponding predicate subqueries with reduced network traffic;

a join ordering module 236, configured to reorder operators according to an optimal join order;

a join algorithm selector 238, configured to identify a main memory algorithm used to implement each join operator; and a federated query plan generator, which builds query plans for optimal performance when data for the query resides at two or more distinct locations (e.g., two physically distinct database servers). This is described by examples in FIGS. 4, 5A, and 5B.

a query execution module 240, which executes the optimized execution plans to retrieve result sets from the database 122 (e.g., according to a main memory algorithm). In some implementations, the query execution module 240 includes an abort module 242, which can abort the execution of the code (e.g., upon detecting an out of memory condition). In some implementations, the abort module 242 communicates with the semantic analysis module 228 or the query optimization module 230 to recompile the ASTs after execution is aborted. In some implementations, the query execution module 240 includes a result reuse module 244, which stores and reuses intermediate results that were created during a previous execution that was aborted;

a query memory management module 246, which detects when there is insufficient memory while executing compiled executable machine code. In some instances, the query memory management module 246 communicates with the query execution module 240 (e.g., the abort module 242 therein) to abort execution of the optimized execution plans;

one or more feature vectors 248 which include cost estimates 250. Example feature vectors, example processes for forming feature vectors, example cost estimates, and example processes for using cost estimated, are described below in reference to FIGS. 5A and 5B described below in accordance with some implementations; and one or more regression models 252 (e.g., ensemble learning algorithms for classification, such as random forests). Example systems and processes for training and using regression models (for determining federation engines to execute federated query plans) are described below in reference to FIGS. 5A and 5B, according to some implementations.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computer system 200, FIG. 2 is intended more as a functional description of the various features that may be present rather than as a structural schematic of the implementations described herein. In practice, and as recognized by those of ordinary skill in the art, modules shown separately could be combined and some modules could be separated.

Figure 3:
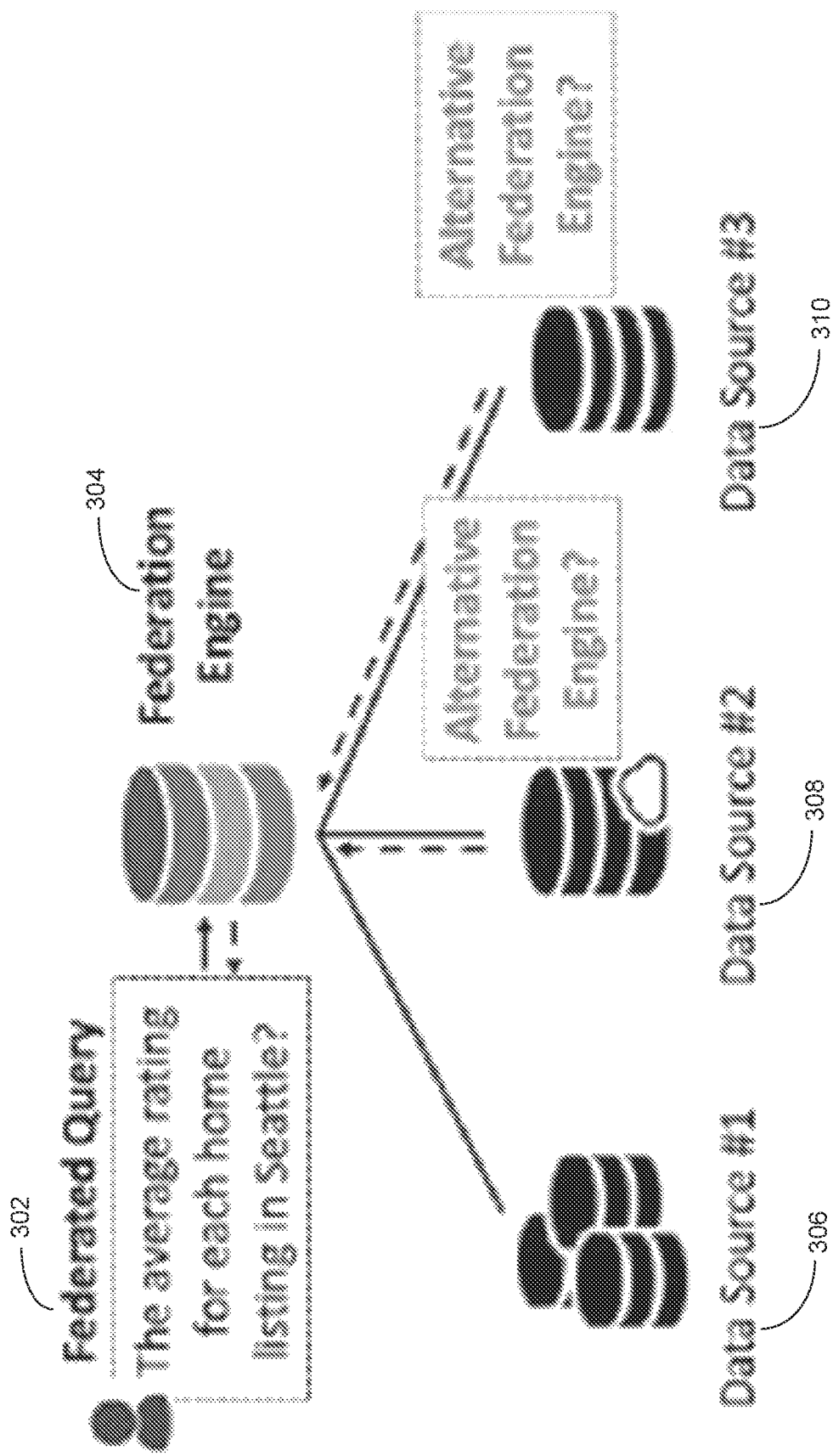
FIG. 3 is a block diagram illustrating execution of a federated query according to some implementations.

FIG. 3 is a block diagram illustrating execution of a federated query 302 according to some implementations.

At a high level, the execution of a federated query (e.g., a query with cross-database joins) shares similarities with traditional query execution: a query plan is generated and then executed. In Tableau, for example, this query plan is composed of component query plans executed on each data source (e.g., the data sources 306, 308, and 310). The component results are then combined, e.g., via joins or unions, by a single data source 304 chosen to be the federation engine. In such a process, the federation engine 304 relies on individual data sources to locally optimize their individual plans and hopes that such a solution also yields a globally performant plan. With a static selection of the federation engine, the federation engine does not change for different workloads. This can lead to long runtimes since a poor choice of federation engine can lead to moving large amounts of data between data sources or lead to splitting the work amongst the components inappropriately.

In traditional databases, a solution would be to create a global cost model which is evaluated over a set of enumerated query plans. However, this is a challenge for federated queries as data sources act as black boxes. Furthermore, the internal cost models of the data sources may be incorrect due to poor configuration or not accounting for unique costs associated with data transfer in federated systems.

The invention disclosed herein uses supervised machine learning approach to dynamically choose a federation engine (e.g., the federation engine 304) and optimizing per query to minimize query runtime. This involves building a simple cost model to predict runtimes as well as partially enumerating a set of plans that the costs can be evaluated on. Doing so requires both extracting information out of the data sources in order to predict runtimes as well as being able to manipulate the system to evaluate and execute the desired plans. Some implementations use mechanisms that are readily available in most database systems, namely through EXPLAIN PLAN and by sending appropriate hints and settings (e.g., enable_nestloop) with the SQL statements themselves. A challenge in federation engine prediction is determining the inputs to the estimated cost model, which are the features of a predictive model. Because data sources are installed in a user's secure working environment, an automated system cannot directly access statistics, such as histograms, that are typically used in cost models. However, using EXPLAIN PLAN allows the system to access a limited number of aggregated statistics and estimates. Some implementations examine several feature sets based on these as well as feature sets based on the SQL queries themselves. Some example features used in a predictive model include: (i) estimated foreign cost, such as the estimated cost of completing a component query plan on each data source, (ii) estimated transfer size, such as the estimated amount of data needed to be transferred from a data source to the federation engine, and (iii) estimated local cost, such as the estimated cost of combining all results received from each data source on the federation engine before returning the final results to users.

A federated query, denoted as $q \in Q$ (a set of all queries), is a query that retrieves information from datasets stored in a plurality of data sources $D_q \subset D$ (a set of all data sources), where $|D_q| > 1$. The data sources may be heterogeneous systems (e.g., including relational databases and Excel spreadsheets) resident on local or remote servers. To execute a federated query q, a database system designates a data source in $D_q$, called a federation engine (also referred to as $FE_q$), to control and coordinate the manipulation of these data sources. The federation engine is in charge of receiving a federated query from a client, generating a federated query plan, receiving and processing data transferred from other data sources, and returning final results to the client.

Choosing a federation engine has a significant impact on the overall runtime of a federation query. For example, suppose a query accesses a large dataset and a small dataset, stored on two distinct remote data sources. Designating the data source storing the small dataset as the federation engine results in having to transfer the large dataset to the federation engine, and thus increases the overall query latency. Instead, a more efficient solution would be to designate the data source that contains the large dataset as the alternative federation engine. This alternative avoids costly data movement across the communication network (e.g., the Internet) and consequently saves query runtime.

One difficulty of formulating this as a query optimization problem is that there is no reasonable cost model that can be assumed. While homogeneous systems can make reasonable assumptions about the relative costs of different operations, federated systems must deal with the unknown performance characteristics of each system as well as factors, such as network speed, which cannot be hard coded. Thus, there is a need for a system to learn the cost model. More generally, the choice of federation engine can be seen as enumerating a set of query plans for each possible engine. In some cases, multiple query plans can be generated for each choice of federation engine through the use of query hints or settings. Thus, in some implementations, a partial enumeration of query plans is combined with a learned cost model to select federation engines from one or more data sources.

Estimating the cost model is challenging since executing queries to collect training data can be expensive. Some implementations choose a limited number of features that carry information content for predicting query runtime. Furthermore, some implementations compute these features from the limited knowledge available from the data sources.

Some implementations generate a set of candidate queries and use the results of an EXPLAIN PLAN for the data sources. Thus, some implementations indirectly access statistics in a way that is readily available in many database systems. Furthermore, this effectively allows such implementations to perform query plan enumeration over a much larger set than the federation engine would otherwise be able to do by itself. In some implementations, as each of the data sources performs query optimization for its portion of work, each enumerates a set of query plans and performs an initial pruning based on its knowledge of local costs. The federation engine takes this small set of good candidates from the set of all enumerated queries and evaluates the cost of the candidates. This accounts for global costs that data sources are not aware of, as well as the heterogeneity of the data sources. The absolute scaling of each component cost estimate is not directly comparable due to differences in hardware capabilities and the software. Thus, some implementations use this approach as a means to mitigate the effects of a poor cost model in data sources.

Figure 4:
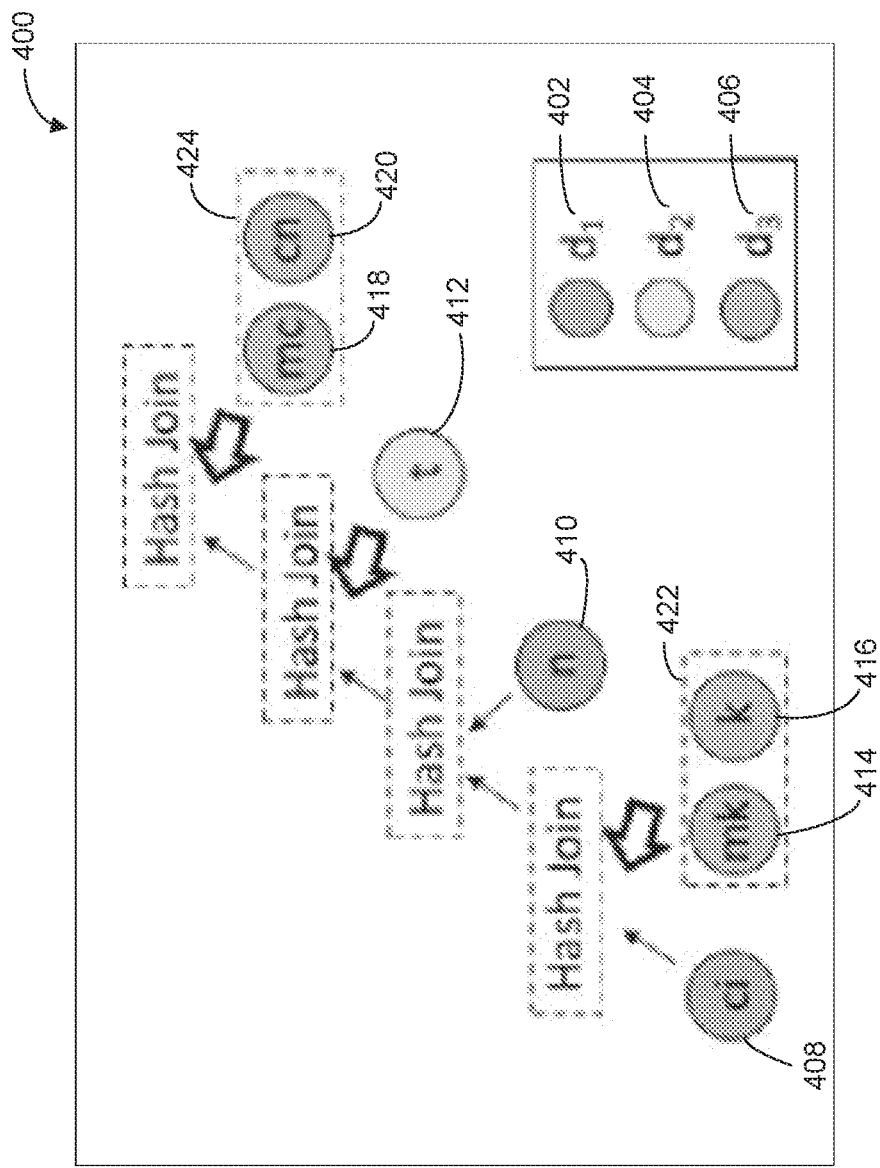
FIG. 4 is an example illustration of a federated query plan, according to some implementations.

FIG. 4 is an example illustration of a federated query plan, according to some implementations. One of the challenges in applying machine learning to choose an alternative federation engine (e.g., for query performance) is in deciding how to represent the federated queries, and what features to use to predict the query runtime. A self-learning system not only needs to consider the traditional optimization challenges in join size estimation and join order enumeration, but also needs to analyze data transfers across a network (that connects various data sources). Depending on how datasets are spread across data sources, query selectivity, as well as system configurations on each data source, selecting one data source as the federation engine is likely to fare better than another. A system can make use of estimates in the query plans and use those estimates to predict a suitable federation engine.

A federated query plan (e.g., a plan generated by a query optimizer) specifies both join order and data that transfers from a data source to a federation engine, according to some implementations. FIG. 4 depicts an example of a federated query plan 400 using a query in Join Order Benchmark. In the example shown, datasets required to answer the query are distributed on three data sources (data source $d_1$ 402, data source $d_2$ 404, and data source $d_3$ 406). Tables 408 and 410 are stored in data source $d_1$ 402, tables 414, 416, 418, and 420 are stored in data source $d_2$ 404, and table 412 is stored in data source da 406. Suppose a system designates $d_1$ 402 as the federation engine. In this example, the system first joins (422) table mk 414 with table k 416, and joins (424) table cn 420 with table mc 418, respectively at the data source $d_3$ 406 and only moves the partial results to the data source $d_1$ 402. The system also scans table t 412 on $d_2$ and moves all tuples in table t 412 to the data source $d_1$ 402. Note that, even for the same query, using different data sources as the federation engine can result in entirely different query plans.

Based on these observations, some implementations represent a federated query plan using three sets of features: (i) estimated foreign cost F, (ii) estimated transfer size T, and (iii) estimated local cost 1. Some implementations target features corresponding to areas where a query optimizer's cost model is likely to be error-prone. For example, query optimizer estimates tend to have more errors for network costs (e.g., due to network links) and foreign costs (e.g., due to unknown hardware configurations).

Some implementations define each feature $f \in F$ as the total estimated cost of all operators processing on a data source d. Similarly, some implementations define each feature $t \in T$ as the total amount of data that needs to be moved from d to the federation engine via a data network. Each t may be calculated as the total number of estimated rows returned at d multiplied by the estimated size in bytes of the returned rows. Some implementations define the local cost 1 as the total estimated cost executed at the federation engine. Examples of this cost include the costs that are generated from scan and join operators that are local to the federation engine.

Figure 5A:
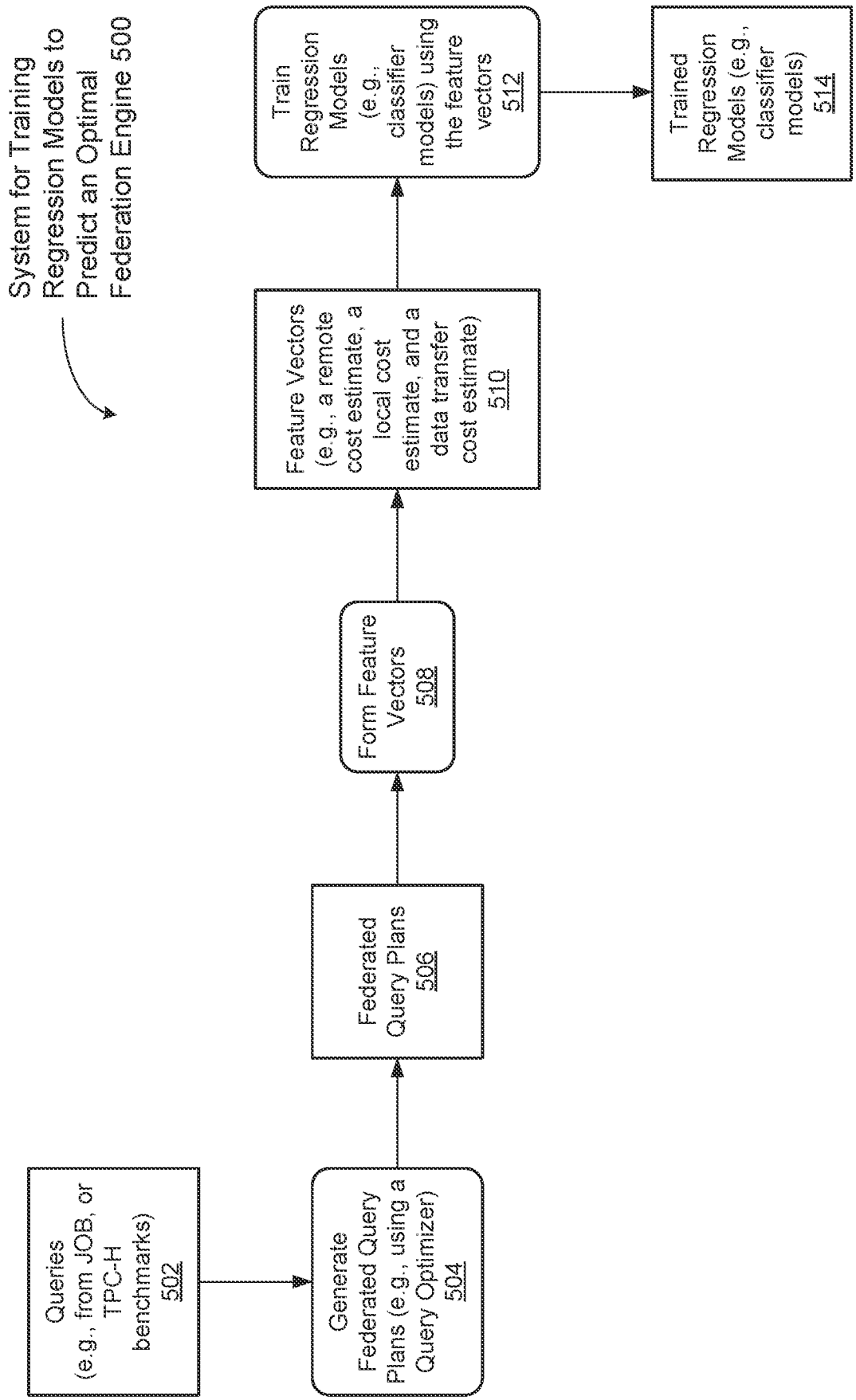
FIG. 5A is a block diagram illustrating a system that trains one or more regression models to predict runtimes for processing federated queries according to some implementations.

FIG. 5A is a block diagram illustrating a system 500 that trains one or more regression models to predict runtimes for processing federated queries according to some implementations.

Given a federated query, some implementations collect (or generate, using a query optimizer) query plans that use each data source in $D_q$ as the federation engine. In some implementations, the query plans are generated by optimizers (e.g., in parallel or asynchronously) without physically running the query.

Some implementations subsequently pass the query plans to a machine learning model. Instead of using a classification model that directly predicts or selects a suitable federation engine, some implementations train a regression model to predict the query runtime of using each data source as the federation engine. Based on the regression model, some implementations designate the data source with the shortest predicted runtime as a preferred (or suitable) federation engine for the federated query. Some implementations use a random forest regression model for its robustness.

Some implementations choose a hub (i.e., a federation engine), from amongst a plurality of data sources, based on a given set of constraints, or constraints learned from a known data set or a known set of queries or workloads. Some implementations avoid poorly performing hubs, using a machine learning model, such as a random forest. Some implementations evaluate various query and query plan features, such as the tables being joined, cost estimates, and actual run times, before determining suitable federation engines from amongst the data sources.

Some implementations use a federation of three servers to develop the regression model. For example, servers pa1 and pa2 are located in Palo Alto, California, while a third server, sea, is located in Seattle, Washington. The pa servers are 20 core (Intel(R) Xeon(R) CPU E5-2630 v4 @ 2.20 GHz) with 32 GB memory. The sea server is a 16 core (Intel(R) Xeon(R) CPU E5-2630 v3 @ 2.40 GHz) with 197 GB memory. The server machines run CentOS Linux 7 and PostgreSQL version 10.4. Average ping time between pa1 and pa2 is approximately 0.19 ms. Average ping time between sea and the Palo Alto servers is 39.28 ms. Average bandwidth between pa1 and pa2 is approximately 942 Mbps (Mega-bits per second). Average bandwidth from sea to the Palo Alto servers is approximately 247 Mbps. Average bandwidth from the Palo Alto servers to sea is approximately 95 Mbps. Some implementations use these network parameters (e.g., topology of connections, connection bandwidth, latencies) to determine a suitable federation engine (or a set of federation engines) to process a federated query. Some implementations also consider robustness or fault tolerance of the network and/or servers in the determination.

Some implementations use PostgreSQL servers. Such servers support access to data stored in other PostgreSQL servers using a Foreign Data Wrapper (FDW). In some implementations, in a federation of servers, FDWs is defined on each server to access data on all other servers. Some implementations create tables for workloads on all servers. Some implementations create foreign tables (or remote tables) in a schema named for the tables located on a different server. Selecting an appropriate schema selects an associated foreign table. For example, if Tables is the set of all tables in the workload and table $i \in$ Tables, then a reference to table i is a local reference, while pa1.tablei is a reference to that same table on server pa1. Some implementations use a fixed assignment of tables, grouped by subject area, to servers. Some implementations optimize table assignment.

Some implementations use one or more workloads to train regression models. For example, some implementations use two workloads, the Join Order Benchmark (JOB) and the TPC-H benchmark. JOB uses a snapshot of data from the Internet Movie Database (IMDb), 3.6 GB as CSV files. There are 113 unique queries with between 3 and 16 joins. Some implementations run the TPC-H benchmark at scale factor 1 (i.e., 1 GB as CSV files). In some implementations, the query workload consists of 10 streams of the 22 standard benchmark queries, for a total of 220 unique queries. Some implementations run all queries on all servers, for a total of 339 JOB queries and 660 TPC-H queries.

In some implementations, although all tables were available at each server, tables were statically assigned by subject area to one of the servers. For example, for JOB, server pa1 is used to access complete_cast, comp_cast_type, link_type, movie_info, movie_info_idx, movie_link, and title. Server pa2 is used to access aka_title, company_name, company_type, keyword, kind_type, movie_companies, and movie_keyword. Server sea is used to access aka_name, cast_info, char_name, info_type, name, person_info, and role_type. For TPC-H, server pa1 accesses lineitem and orders, server pa2 accesses part and partsupp, and server sea accesses customer, nation, region, and supplier. Some implementations use baseline heuristics (e.g., table sizes) to fine-tune the machine learning process.

Thus, machine learning techniques can significantly improve query performance (e.g., compared to a Postgres query optimizer) by selecting a suitable hub in a federation of data sources. Although the above discussion used the Join Order Benchmark and TPC-H, some implementations use a host of other workloads for training the regression models.

Some implementations use a number of different query features, features of the SQL engines and features of the query plans for training and/or decision processes. Some implementations use a combination of features or train individual classifiers on distinct set of features. Some implementations combine factors, such as accuracy, improvement in query runtime, avoidance of poorly performing or unreliable hubs, for determining a suitable set of federation engines for processing federated queries.

Some implementations use more queries (than discussed above) from the Join Order Benchmark and TPC-H benchmarks, use more federations (e.g., vary the assignment of tables to servers), more workloads (e.g., TPC-DS and query workloads from Tableau), more query plans (e.g., more than one query plan for each data source, top 5 plans generated by a query optimizer selecting a data source as a federation engine) during the training phase. Some implementations consider query plans with or without a Nested Loop Join in determining a suitable hub. Some implementations select multiple hubs for processing a federated query, and designate a hub based on factors, such as network load.

Referring back to FIG. 5A, in accordance with some implementations, a method 500 executes at a computer system having one or more processors and memory storing one or more programs configured for execution by the one or more processors. The method builds a regression model 252 for predicting runtimes of federated queries, according to some implementations. The method includes obtaining a plurality of queries 502 (sometimes called federated queries). Each query specifies retrieval of data from datasets stored in a plurality of data sources (e.g., data sources in different physical locations). Each data source is coupled to the other data sources via a communication network. For example, in FIG. 3, the federated query 302 requires retrieval of data from datasets stored in the data sources 306, 308, and 310, and the data sources are connected via a communication network (not shown). The method further includes generating (504) a plurality of federated query plans 506 for each federated query. Each federated query plan corresponds to executing a respective federated query using a respective data source as a federation engine. Each federated query plan includes a plurality of query operators. Each query operator specifies retrieval of data from datasets stored in a corresponding data source. An example of a federated query is described above in reference to FIG. 4.

The method includes, for each federated query plan, forming (508) a respective feature vector 510 (e.g., one of the feature vectors 248) whose components include a plurality of features. The features include: a remote cost estimate for executing query operators of the respective federated query plan on data sources distinct from the respective data source, a local cost estimate for executing query operators of the respective federated query plan on the respective data source, and a data transfer cost estimate for transferring partial results of the respective federated query plan, via the communication network, from data sources distinct from the respective data source to the respective data source. In some implementations, the method includes calculating and storing the cost estimates for the feature vectors (e.g., in cost estimates 250 in the memory 214). In some implementations, in relation to the remote cost estimate, only the operators that specify retrieval of data from a data source are executed on that data source. In some implementations, in relation to the local cost estimate, only the operators that specify retrieval of data from the respective data source are executed on the respective data source. In some implementations, in relation to the data transfer cost estimate, partial results are results from executing query operators of the federated query plan on a data source distinct from the respective data source, and the query operators specify retrieval of data from the data sources distinct from the respective data source. In some implementations, the data transfer cost estimate includes estimates of the cost of data transfers between the plurality of data sources (e.g., to achieve the results of the federated query plan) prior to transferring partial results to a federation engine. In some implementations, the cost estimates described herein include actual or profiled measurement values (e.g., received from, or measured in coordination with, one or more third party data sources).

The method further includes training (512) a regression model 514 (e.g., one of the regression models 252), using the feature vectors for the plurality of federated query plans, to predict runtimes for executing federated queries using the plurality of data sources as a federation engine.

In some implementations, the method obtains the remote cost estimate, the local cost estimate, and the transfer cost estimate by measuring computation and communication times by executing the respective federated query plan on its corresponding data source.

In some implementations, the regression model comprises a plurality of classifiers. Each classifier is a respective decision tree constructed according to a respective distinct subset of the plurality of features and according to a respective distinct subset of predetermined sample feature vectors corresponding to queries with predetermined runtimes. Each classifier predicts a respective predicted runtime for executing queries. The regression model predicts the runtimes for executing queries using a weighted sum of the plurality of predicted runtimes.

In some implementations, the feature vector includes one or more features extracted (or selected) from among: query operator identifiers corresponding to query operators in the respective federated query plan; table identifiers corresponding to tables accessed by the respective federated query plan; data field identifiers corresponding to data fields accessed by the respective federated query plan; and a network topology identifier corresponding to network topology of the communication network. In some implementations, query operator identifiers include elements from a query execution plan, such as information extracted from an output of EXPLAIN command. In some implementations, query operator identifiers include an indicator that specifies whether a Nested Loop Join operator is used to generate a query execution plan.

In some implementations, prior to generating the plurality of federated query plans, the method includes assigning each dataset of one or more datasets to a first data source of the plurality of data sources. The one or more datasets corresponds to datasets required for processing the plurality of queries. The feature vector further includes one or more features extracted from an assignment identifier corresponding to the assignment of the one or more datasets. As an example of static assignment of tables, the method further includes classifying each dataset based on subject areas, and assigning each dataset to a respective data source based on its subject area, according to some implementations.

In some implementations, the remote cost estimate includes cost estimates for joining one or more tables on data sources distinct from the respective data source.

In some implementations, the plurality of data sources includes one or more PostgreSQL servers that support access to data stored in other data sources using a Foreign Data Wrapper (FDW). The data transfer cost estimate includes estimation of cost of data transfers between data sources using FDW.

In some implementations, the plurality of queries used for training are taken from the Join Order Benchmark (JOB) and the TPC-H benchmark.

In some implementations, the feature vector includes one or more features that specify table sizes corresponding to tables accessed by the respective federated query plan.

In some implementations, the plurality of federated query plans includes a first federated query plan and a second federated query plan. The first and the second federated query plans each corresponding to executing a first federated query using a first data source as a federation engine. Thus, the method includes evaluating multiple federated query plans for a data source.

In some implementations, a query optimizer 230 generates the plurality of federated query plans.

In some implementations, the plurality of federated query plans includes at least one query plan that uses a Nested Loop join.

In some implementations, the feature vector includes one or more features that measure robustness of the respective federated query plan. Thus, in some implementations, the method includes consideration of robustness of server and/or query plans in addition to one or more performance indicators.

In some implementations, the plurality of data sources includes at least one third-party data source. For example, a third-part data source is a data source for which a federation engine does not have access to query plans generated by the data source, so the federation engine cannot accurately predict costs (e.g., can only estimate remote query processing costs).

Figure 5B:
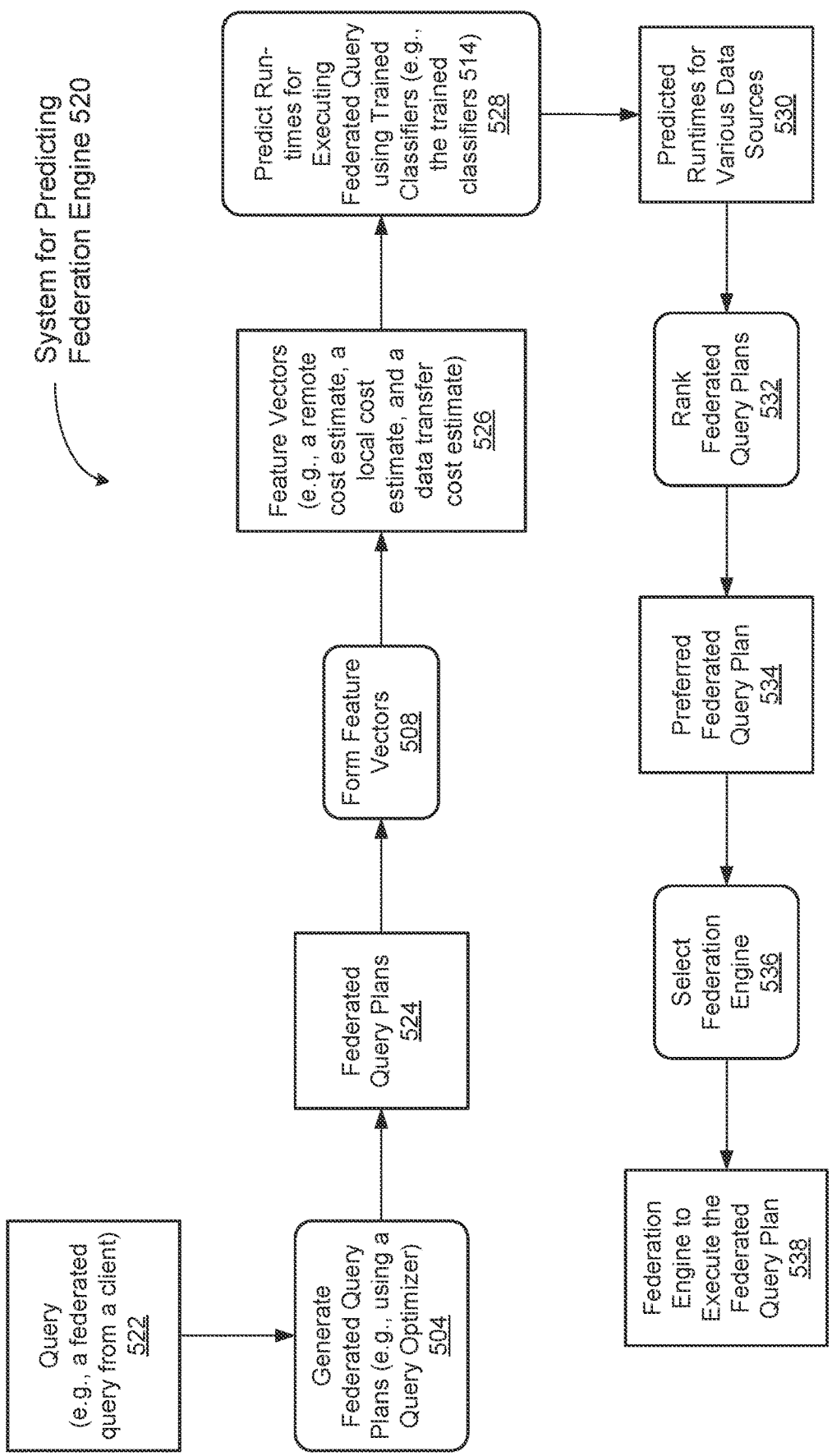
FIG. 5B is a block diagram illustrating a system that optimizes federated queries by determining suitable federation engines for processing the federated queries using trained regression models, according to some implementations.

FIG. 5B is a block diagram illustrating a system 520 that optimizes federated queries by determining suitable federation engines for processing the federated queries using trained regression models (e.g., the regression models 514 trained via the process described above in reference to FIG. 5A), according to some implementations.

In another aspect, a method is provided for selecting a federation engine to process a federated query. The method is performed at a computer system 200 having one or more processors and memory storing one or more programs configured for execution by the one or more processors. The method includes receiving, from a client, a query 522 that specifies retrieval of data from datasets stored in a plurality of data sources (e.g., at distinct physical locations), each data source coupled to the other data sources via a communication network. The method also includes generating (504) a plurality of federated query plans 524 based on the query 522, as described above in reference to FIG. 5A. Each federated query plan corresponds to executing the query using a respective data source as a federation engine. Each federated query plan includes a plurality of query operators. Each query operator specifies retrieval of data from datasets stored in a corresponding data source. For each federated query plan, the method includes forming (508) a feature vector 526 v=[$v_1, v_2, \ldots, v_n$] (e.g., as described above in reference to FIG. 5A) whose components include a plurality of features. The plurality of features include a remote cost estimate for executing query operators of the respective federated query plan on data sources distinct from the respective data source; a local cost estimate for executing query operators of the respective federated query plan on the respective data source; and a data transfer cost estimate for transferring partial results, via the communication network, from data sources distinct from the respective data source to the respective data source. In some implementations, in relation to the remote cost estimate, only the operators that specify retrieval of data from a data source are executed on that data source. In some implementations, in relation to the local cost estimate, only the operators that specify retrieval of data from the respective data source are executed on the respective data source. In some implementations, in relation to the data transfer cost estimate, partial results are results from executing query operators of the federated query plan on a data source distinct from the respective data source, and the query operators specify retrieval of data from the data sources distinct from the respective data source.

The method further includes performing a sequence of steps for each of the federated query plans. The sequence of steps includes, for each classifier of a plurality of trained classifiers, computing (528) a respective predicted runtime for executing the respective federated query plan. Each classifier is a respective decision tree constructed according to a respective distinct subset of the plurality of features and according to a respective distinct subset of predetermined sample feature vectors corresponding to queries with predetermined runtime. The sequence of steps also includes computing an overall predicted runtime 530 for executing the respective federated query plan using a weighted sum of the plurality of predicted runtimes, and ranking (532) the plurality of federated query plans 524 based on the overall predicted runtimes for each of the federated query plans to obtain a preferred federated query plan 534. The sequence of steps further includes selecting (536), from the plurality of data sources, a federation engine 538 based on the preferred federated query plan.

In some implementations, the method further includes coordinating (or generating plans for) executions and data movements among the plurality of data sources for executing the query using the federation engine. Examples of management of the execution and data transfers between data sources are described above in reference to FIGS. 3 and 4, according to some implementations.

In some implementations, the method further includes selecting, from the plurality of data sources, a plurality of federation engines based on ranking the plurality of federated query plans.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of selecting a federation engine to process a query, performed at a computer system having one or more processors and memory storing one or more programs configured for execution by the one or more processors, the method comprising:
receiving, from a client, a query that specifies retrieval of data from datasets stored in a plurality of data sources at distinct physical locations, each data source coupled to the other data sources via a communication network;
generating a plurality of federated query plans based on the query, each federated query plan specifying execution of the query using a respective data source as a federation engine, wherein each federated query plan includes a plurality of query operators and each query operator specifies retrieval of data from datasets stored in a corresponding data source, wherein each federated query plan designates a respective federation engine that (i) controls and coordinates federation of data sources, (ii) receives and processes data transferred from other data sources, (iii) processes the received data, and (iv) returns final results for the respective federated query plan;
for each federated query plan, forming a feature vector v=[11, 12, ..., Un] whose components include a plurality of features selected from the group consisting of:
a remote cost estimate for executing query operators of the respective federated query plan on data sources distinct from the respective data source;
a local cost estimate for executing query operators of the respective federated query plan on the respective data source; and
a data transfer cost estimate for transferring partial results, via the communication network, from data sources distinct from the respective data source to the respective data source;
predicting runtime for executing each of the federated query plans, using a trained regression model;
ranking the plurality of federated query plans based on the predicted runtime for each of the federated query plans to obtain a preferred federated query plan; and
selecting, from the plurality of data sources, a federation engine based on the preferred federated query plan.

2. The method of claim 1, further comprising coordinating executions and data movements among the plurality of data sources for executing the query using the federation engine.

3. The method of claim 1, further comprising selecting, from the plurality of data sources, a plurality of federation engines based on ranking the plurality of federated query plans.

4. The method of claim 1, wherein the remote cost estimate, the local cost estimate, and the data transfer cost estimate are obtained by measuring computation and communication times by executing the respective federated query plan on its corresponding data source.

5. The method of claim 1, wherein the trained regression model comprises a plurality of classifiers, each classifier is a respective decision tree constructed according to a respective distinct subset of the plurality of features and according to a respective distinct subset of predetermined sample feature vectors corresponding to federated queries with predetermined runtimes, each classifier predicts a respective runtime for executing queries, and the regression model predicts runtimes for executing queries using a weighted sum of predicted runtimes from the plurality of classifiers.

6. The method of claim 1, wherein predicting the runtime for executing each of the federated query plans comprises:
for each of the federated query plans:
for each classifier of a plurality of trained classifiers, computing a respective predicted runtime for executing the respective federated query plan, wherein each classifier is a respective decision tree constructed according to a respective distinct subset of the plurality of features and according to a respective distinct subset of predetermined sample feature vectors corresponding to federated queries with predetermined runtime; and
computing an overall predicted runtime for executing the respective federated query plan using a weighted sum of a plurality of predicted runtimes for the plurality of federated query plans.

7. The method of claim 1, wherein the feature vector further includes one or more features from the group consisting of:
query operator identifiers corresponding to query operators in the respective federated query plan;
table identifiers corresponding to tables accessed by the respective federated query plan;
data field identifiers corresponding to data fields accessed by the respective federated query plan; and
a network topology identifier corresponding to network topology of the communication network.

8. The method of claim 1, further comprising, prior to generating the plurality of federated query plans, assigning each dataset of one or more datasets to a first data source of the plurality of data sources, wherein the one or more datasets correspond to datasets required for processing the plurality of federated query plans, and wherein the feature vector further includes one or more features extracted from an assignment identifier corresponding to the assignment of the one or more datasets.

9. The method of claim 8, further comprising:
classifying each dataset based on subject areas; and
assigning each dataset to a respective data source based on its subject area.

10. The method of claim 1, wherein the remote cost estimate includes cost estimates for joining one or more tables on data sources distinct from the respective data source.

11. The method of claim 1, wherein the plurality of data sources includes one or more PostgreSQL servers that support access to data stored in other data sources using a Foreign Data Wrapper (FDW), and wherein the data transfer cost estimate includes estimation of cost of data transfers between data sources using FDW.

12. The method of claim 1, wherein the plurality of queries is selected from the group consisting of: Join Order Benchmark (JOB) and TPC-H benchmark.

13. The method of claim 1, wherein the feature vector includes one or more features that measure table sizes corresponding to tables accessed by the respective federated query plan.

14. The method of claim 1, wherein the plurality of federated query plans includes a first federated query plan and a second federated query plan, the first and the second federated query plans each corresponding to executing a first federated query using a first data source as a federation engine.

15. The method of claim 1, wherein the plurality of federated query plans is generated using a query optimizer.

16. The method of claim 1, wherein the plurality of federated query plans includes at least one query plan that uses a Nested Loop join.

17. The method of claim 1, wherein the feature vector includes one or more features that measure robustness of the respective federated query plan.

18. The method of claim 1, wherein the plurality of data sources includes at least one third-party data source.

19. A computer system, comprising:
one or more processors; and
memory storing one or more programs for execution by the one or more processors, the one or more programs including instructions for:
receiving, from a client, a query that specifies retrieval of data from datasets stored in a plurality of data sources at distinct physical locations, each data source coupled to the other data sources via a communication network;
generating a plurality of federated query plans based on the query, each federated query plan specifying execution of the query using a respective data source as a federation engine, wherein each federated query plan includes a plurality of query operators and each query operator specifies retrieval of data from datasets stored in a corresponding data source, wherein each federated query plan designates a respective federation engine that (i) controls and coordinates federation of data sources, (ii) receives and processes data transferred from other data sources, (iii) processes the received data, and (iv) returns final results for the respective federated query plan;
for each federated query plan, forming a feature vector $v=[v_1, v_2, \ldots, v_n]$ whose components include a plurality of features selected from the group consisting of
a remote cost estimate for executing query operators of the respective federated query plan on data sources distinct from the respective data source;
a local cost estimate for executing query operators of the respective federated query plan on the respective data source; and
a data transfer cost estimate for transferring partial results, via the communication network, from data sources distinct from the respective data source to the respective data source;
predicting runtime for executing each of the federated query plans, using a trained regression model;
ranking the plurality of federated query plans based on the predicted runtime for each of the federated query plans to obtain a preferred federated query plan; and
selecting, from the plurality of data sources, a federation engine based on the preferred federated query plan.

20. A non-transitory computer readable storage medium storing one or more programs, the one or more programs configured for execution by a computing device having one or more processors, and memory, the one or more programs comprising instructions for:
receiving, from a client, a query that specifies retrieval of data from datasets stored in a plurality of data sources at distinct physical locations, each data source coupled to the other data sources via a communication network;
generating a plurality of federated query plans based on the query, each federated query plan specifying execution of the query using a respective data source as a federation engine, wherein each federated query plan includes a plurality of query operators and each query operator specifies retrieval of data from datasets stored in a corresponding data source, wherein each federated query plan designates a respective federation engine that (i) controls and coordinates federation of data sources, (ii) receives and processes data transferred from other data sources, (iii) processes the received data, and (iv) returns final results for the respective federated query plan;
for each federated query plan, forming a feature vector $v=[v_1, v_2, \ldots, v_n]$ whose components include a plurality of features selected from the group consisting of:
a remote cost estimate for executing query operators of the respective federated query plan on data sources distinct from the respective data source;
a local cost estimate for executing query operators of the respective federated query plan on the respective data source; and
a data transfer cost estimate for transferring partial results, via the communication network, from data sources distinct from the respective data source to the respective data source;
predicting runtime for executing each of the federated query plans, using a trained regression model;
ranking the plurality of federated query plans based on the predicted runtime for each of the federated query plans to obtain a preferred federated query plan; and
selecting, from the plurality of data sources, a federation engine based on the preferred federated query plan.

* * * * *